PLATED WIRE RECORDING HEAD WITH SELECTIVE ELECTRONIC SWITCHING TO INDIVIDUAL TRACKS

Filed April 4, 1966

INVENTOR
DONALD T. BEST

BY Thomas P. Murphy
ATTORNEY

United States Patent Office 3,495,230
Patented Feb. 10, 1970

3,495,230

PLATED WIRE RECORDING HEAD WITH SELECTIVE ELECTRONIC SWITCHING TO INDIVIDUAL TRACKS

Donald T. Best, Plymouth Meeting, Pa., assignor to Sperry Rand Corporation, New York, N.Y., a corporation of Delaware Filed Apr. 4, 1966, Ser. No. 539,958
Int. Cl. G11b *5/00;* G01d *15/06, 15/12*
U.S. Cl. 340—174.1 4 Claims

ABSTRACT OF THE DISCLOSURE

The present device provides a plated wire element as a magnetic read/write head which has a gap etched in the magnetizable material of the plated wire element along the length of the wire to provide an elongated recording gap. Placed orthogonally across the plated wire is a plurality of drive wires. If any one or more of the drive wires is selectively energized it creates a flux which is oriented parallel to the axis of the plated wire thereby blocking any circumferential flux which is necessary for a read/write operation. Accordingly, particular channels can be selectively energized (by not blocking the same) for a read/write operation.

This invention which is the property of the Sperry Rand Corporation, relates to a selectable track magnetic head and more particularly to a magnetic head made from a plated wire wherein a single wire functions as a selectable head for a plurality of magnetic recording tracks.

A problem long associated with magnetic recording and/or reading has been the high cost of magnetic heads. Where multichannel recording systems are used, the high cost of magnetic heads has prohibited the use of a magnetic head for each channel. Instead, one head has been used to provide system access for each of several groups of channels. This entails the use of one head to service a plurality of tracks. Obviously, a single head cannot simultaneously service all channels in its service group. Thus, where simultaneous access to all tracks or channels is unnecessary (as is the most common case), various elaborate schemes are presently in use for mechanically positioning of individual magnetic heads to a number of channels. While mechanical positioning schemes have reduced the required number of magnetic heads and, therefore, the expense associated with having a magnetic head for each recording track, the cost, even with such a scheme, is still very high.

Furthermore, in many instances it is necessary or highly desirable particularly for higher speed access to have a magnetic head for each channel regardless of cost. In these instances electronic switching of a magnetic head to read and write amplifiers has been employed. Having a magnetic head for each track is by far the most expensive of the two methods.

The present invention contemplates a system which provides a magnetic head for each recording channel but which drastically reduces the cost of such a system below that of the mechanical positioning system. Thus, the present invention offers all the advantages of having a magnetic head for each channel at a much lower cost than even the mechanical positioning system.

As is often the case in a research and development effort having the goal of a cost break through in a particular produce or system line, other advantages naturally flow from achievement of the original objective. Many times these advantages prove to be of equal importance with the original cost reduction.

The present invention is such an instance. Aside from low cost, the present invention offers an unusually simple, compact, low power consuming magnetic recording and/or reading system together with high speed switching to a particular recording channel.

More specifically the present invention contemplates a magnetic recording and/or reading system utilizing a new concept in magnetic head construction in novel combination with electrical circuitry for switching the head to any desired one of a plurality of recording tracks without the need of actual mechanical positioning of the magnetic head.

The magnetic head of the present invention comprises an electrically conductive wire coated with a magnetic material. A recording gap is scribed, etched or otherwise formed in the magnetic material exposing a narrow strip of the original wire along its longitudinal dimension. The gap is positioned adjacent a recording medium such as tape which moves in a direction perpendicular to the axis of the wire. A plurality of rectangularly shaped electrical conductors (word straps) are disposed over and perpendicular to the wire spaced in adjacent relationship to each other and parallel to the surface of the recording medium. The number of recording tracks is determined by the number of word straps and is equal thereto in number. A track is selected by passing current through all the word straps except the one most proximate to the selected recording track. A pulse of current then passed through the electrical conductor of the magnetic head is recorded in the form of a magnetic dipole at the selected track. Reading is also accomplished by applying current to all but the selected word strap.

The advantages and precise mode of operation of a preferred embodiment of the present invention will become more apparent upon reading the following description wherein.

Figure 1:
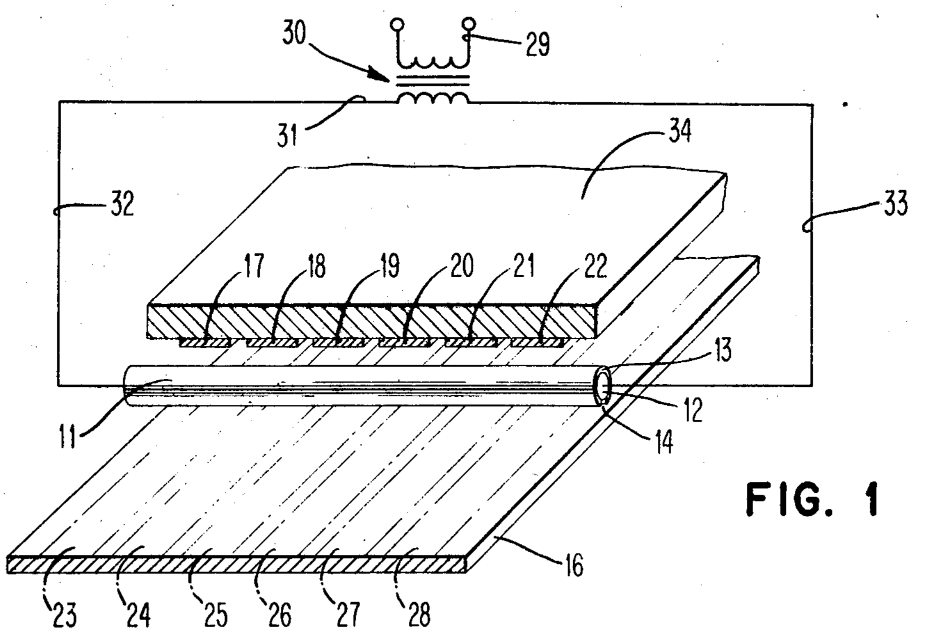
FIGURE 1 illustrates a preferred embodiment of the present invention.

Referring now more particularly to FIGURE 1 there is shown a plated wire magnetic head 11. Although the magnetic head 11, per se, forms no part of the present invention it is novel and is described in detail. The magnetic head 11 comprises a wire or electrical conductor 12 of any conductive material, e.g., a beryllium-copper base material may be used. The wire 12 may be of any cross-sectional shape, e.g., it may be circular, rectangular or triangular, etc.

The wire 12 is coated, as by electro-plating, with any suitable magnetic material, e.g., a nickel-iron base material may be used. The diameter of the wire used may vary between 0.5 and 5 mils with the thickness of the magnetic coating varying between 10,000 and 30,000 angstroms. The foregoing dimensions should not be construed as limiting but are given merely to provide some idea of the relative dimensions involved.

A recording gap 14 is scribed, etched or otherwise formed in the magnetic coating 13. The gap 14 exposes a narrow strip of the wire 12 along its longitudinal dimension.

While it is not essential for successful utilization of the present invention, the magnetic coating 13 is formed on the wire 12 in the presence of an orienting magnetic field which causes the magnetic coating 13 to have a circumferential easy direction of magnetization. A current through the wire 12 induces a circumferential magnetic field in the magnetic coating 13 which is either clockwise or counter-clockwise direction depending on the direction of the current through the wire 12. The magnetic field fringes about the gap 14 in a pattern similar to the fringing field of flux about the recording gap of a conventional toroidal magnetic head.

It is this fringing field of flux both in the magnetic head 11 of the present invention and in the more conventional toroidal magnetic head that activates the surface of a magnetic recording medium, for example, tape having an iron-oxide coating thereon to thereby record a bit of information in the form of a magnetic dipole. The head is also operable with any other form of magnetic recording surface such as a magnetic drum or disc, which may have oxide coatings or metallic magnetic coatings. The fringing field associated with the gap 14 of the magnetic head of the present invention differs from the fringing field associated with a more conventional magnetic head in that it has a width or size much smaller (e.g., 10 to 40 or more times smaller) than that associated with the more conventional head. Thus, the magnetic head of the present invention is capable of higher pulse density recording, being able to record and read a wave length on a recording surface which is only slightly greater than the gap width of the head. This is contrasted with a conventional head which is normally useful only for wave lengths considerably greater than the gap width.

As will be more fully explained hereinbelow if a saturating magnetic field is set up in the magnetic coating 13 in the axial direction, the normal magnitude of recording current through the wire will be insufficient to induce a strong circumferential magnetization in the magnetic coating 13. This drastically reduces the fringing field of flux about the gap 14 because the magnetomotive force through the air gap 14 is small. Thus, if an axial field of flux is set up in the magnetic coating, an information signal or pulse passed through the wire 12 is not recorded on the magnetic medium.

It is this capability of inhibiting recording by means of a magnetic field of flux in the axial direction in the magnetic coating 13 which is made use of to switch the magnetic head of the present invention to individual recording tracks or channels.

The magnetic head 11 is rigidly held by means not shown in close proximity to a magnetic recording medium such as magnetic tape 16. The tape 16 is adapted to be moved past the gap 14 in a direction perpendicular to the axis of the wire 12 (the supply and take-up reels for the magnetic head 11, as well as the control therefor, may be conventional and are not shown).

A plurality of thin, flat conductors 17 through 22 hereinafter called word straps are disposed over the magnetic head 11 in positions parallel to the surface of the magnetic tape 16. These word straps 17 through 22 may be embedded or otherwise disposed in support member 34. The word straps 17 through 22 are substantially rectangular in shape and are disposed in side-by-side relationship over the length of the wire 12.

These world straps 17 through 22 are close enough to the magnetic head 11 so as to be magnetically coupled thereto. When, for example, current is passed through word strap 17 which is perpendicular to the axis of the wire 12, the segment of the magnetic coating 13 on that portion of the wire 12 substantially directly under the word strap 17 is magnetized in the axial direction. If current is also passed through the word strap 18, the segment of the magnetic head 11 substantially directly under the word strap 18 has its associated magnetic coating 13 also magnetized in the axial direction. If in such a situation a current pulse were passed through the wire 12, a circumferential magnetic field would be set-up within the magnetic coating 13 at all areas along the wire 12 except those areas which were magnetized in the axial direction.

As may be seen more clearly hereinafter, the magnetic head 11 is, in effect, a plurality of magnetic heads with each segment of the magnetic head 11 corresponding to a particular one of the word straps 17 through 22. The fact that selected segments (those under energized ones of the word straps 17 through 22) of the magnetic coating 13 are magnetized in the axial direction does not prevent a pulse of current through the wire 12 from magnetizing the remaining segments in the circumferential direction.

The recording surface of the magnetic tape 16 is disposed closely adjacent to the gap 14. Each of the word straps 17 through 22 defines a recording track or channel 23 through 28, respectively, on the surface of the magnetic tape 16. The recording channels 23 through 28 are disposed parallel and opposite to the word straps 17 through 22, respectively.

When it is desired to write one or more bits of data on one of the tracks 23 through 28, all of the word straps 17 through 22 are energized with a current except that strap corresponding to the track on which the information is to be written. For example, if it is desired to select track 25 of the tape 16 to record a bit of information, all of the word straps except the word strap 19 are energized with a current. In such a situation the magnetic coating 13 everywhere except in the portion of the magnetic head 11 in proximity to the word strap 19 and the recording channel 25 is switched to have a magnetic field in the axial direction. Thus, the effective magnetic permeability of the magnetic coating 13 in the circumferential direction is very low except in the selected area.

The input data in the form of a current pulse is applied to the primary winding 29 of the transformer 30. The current pulse is stepped up to a desired magnitude in the secondary winding 31 of the transformer 30. The current pulse is stepped up to a desired magnitude in the secondary winding 31 of the transformer 30. The secondary winding 31 is connected in series with the wire 12 by means of conductors 32 and 33.

The pulse of current representing data to be recorded circumferentially magnetizes only that portion of the magnetic coating 13 on the magnetic head 11 whose corresponding word strap 19 has not been energized. The portion of the gap 14, corresponding to the length of the wire 12 whose magnetic coating 13 is circumferentially magnetized, causes the magnetic field there to fringe about an area including the surface of the tape 16. The magnetization of the tape 16 is switched in accordance with the polarity of the current pulse in the wire in the vicinity of the affected portion of the gap 14 with the result that a magnetic dipole is recorded. The polarity of the dipole is determined by the polarity of the information carrying current pulse. In a similar fashion any other one of the recording tracks 17 through 22 may have data recorded thereon. Thus, as the tape 16 moves past the gap 14 any one of the recording tracks 23 through 28 may be selected to have data recorded thereon without any actual movement of the magnetic head 11. The magnetic head 11 is, in effect, a plurality of magnetic heads equal in number to the number of word straps whose number, in turn, defines the number of recording tracks. The wire 12 of the magnetic head 11 may be of any desired length and there may be any number of word straps and, therefore, any number of recording tracks.

Selection of a track to read is done in almost an identical manner as selection of a track to record. All of the word straps 17 through 22 are energized except the one whose respective track is to be read. This induces an axial magnetic field in all portions of the magnetic material 13 of the wire 12 except the portion corresponding to the unenergized word strap. The portion of the magnetic material 13 corresponding to the recording track to be read has a circumferential magnetic field induced therein when the gap passes a recorded bit of information on the selected track. This induces a pulse of current in the wire 12 since the magnetic coating 13 in this area has a high enough permeability to couple the magnetic dipole on the surface of the tape 16 to the magnetic head 11. The polarity of the pulse corresponds to the magnetic polarity of the recorded bit of information. The induced pulse of current causes an output current or voltage pulse to appear in winding 29 of the transformer 30. This pulse is then fed to an appropriate read-out element.

Figure 2:
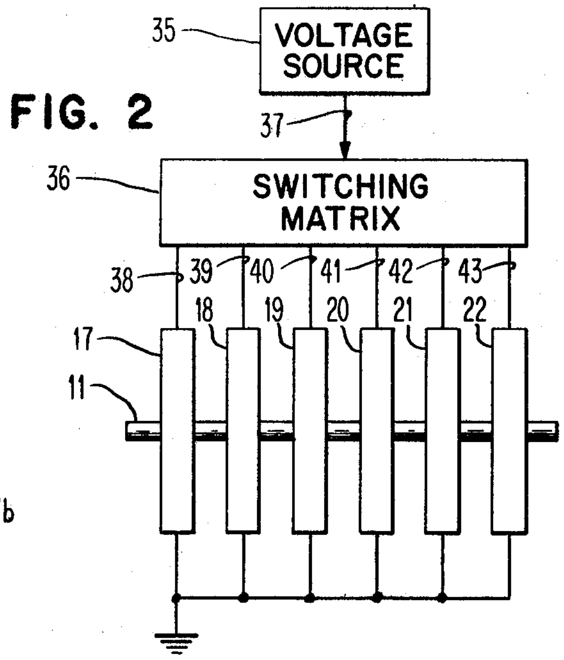
FIGURE 2 illustrates an energizing circuit for the word strap of the present invention.

One way in which the word straps 17 through 22 may be energized with current is illustrated in FIGURE 2. A source 35 of D.C. current is connected to switching matrix 36 via electrical conductor 37. A plurality of electrical conductors 38 through 43 are connected between the switching matrix and one end of word straps 17 through 22, respectively. The other ends of the word straps are connected to ground.

Switching matrix 36 comprises switch means for connecting the source 35 of current to all but a selected one of the word straps 17 through 22. The selected word strap through which current is not passed is, of course, the one associated with the recording track which is to be recorded or read. The switching means included within the switching matrix 36 may be of a conventional type, e.g., a relay switch connected between the source 35 and each of the conductors 38 through 43. The relays can then be energized in accordance with the desired word straps to be connected to the current source 35.

Where it is desired to conserve power various other methods of energizing the word straps 38 through 43 may be employed. For example, a switching matrix might be used to connect all but the selected word strap in series to one current source. The power dissipated by this method would be greatly reduced over the previous method where the unselected word straps are connected in parallel to several current sources.

Another way to energize the word straps 38 through 43 would be to use two word straps for each recording track. One of each set of two words straps would be continuously energized in series with each other. To select a track the unenergized word strap associated with the selected track is energized in the opposite direction thereby producing a cancellation of the magnetic field which causes the selected portion of the magnetic material 13 of the magnetic head 11 to be magnetized in the axial direction. The power used in this arrangement would be 2 I.E. where I is the word strap current and E is the source voltage. In the arrangement shown in FIGURE 2 the power used would be (*n*—1Q I.E. where *n* is the number of word straps.

Figure 3:
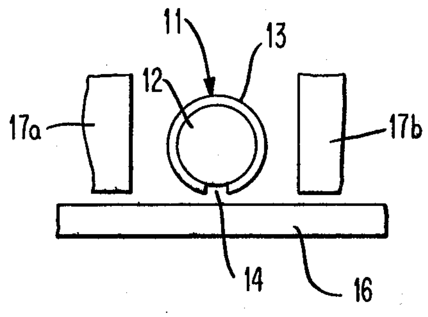
FIGURE 3 illustrates a modification of the energizing means shown in FIGURE 2.

FIGURE 3 is an end view of the foregoing discussed doubled word strap embodiment of the present invention. The magnetic head 11 has its recording gap 14 disposed in read-write relationship to the recording surface of record tape 16. Word straps 17*a* and 17*b* are disposed on either side of the magnetic head substantially as shown. Current through either one of the word straps 17*a* or 17*b* produces an axial magnetic field in that portion of the magnetic material 13 is proximity to the energized word straps. However, if both word straps 17*a* and 17*b* are energized simultaneously and in opposite directions, their respective magnetic fields mutually cancel and no axial field is produced.

FIGURE 3 shows only one set of word straps. It should be understood, however, that a plurality of similar sets of word straps would be disposed along the length of the magnetic head 11. One of each set, e.g., all those on the same side of the magnetic head 11 as the word strap 17*a* would be electrically connected in series. Selection of a recording track for reading or writing is done simply by energizing the selected one of the word straps on the other side of the magnetic head 11 in an opposite direction.

Alternatively a modification of the arrangement of FIGURE 3 might be used. Thus, instead of double word straps, one of each set of word straps could be replaced with a permanent magnet. Each permanent magnet would maintain an axial magnetic field in that portion of the magnetic material 13 in proximity to it. Energization of the selected word strap in the appropriate direction would cancel the associated axial magnetic field.

The embodiments of the invention in which an exclusive property or privilege is claimed are defined as follows:

1. A magnetic read/write system to be used with a magnetic recording means which has a plurality of recording channels comprising in combination: a continuously plated wire read/write head which comprises an electrically conducting wire which is circumferentially plated along its length with a thin layer of magnetizable material; a continuous gap formed in said thin layer of magnetizable material and disposed longitudinally along the length of said plated wire thereby forming a continuous recording gap; channel selective means disposed in close proximity to said printing wire and having a plurality of electrical conductors with each one associated with a different channel of said magnetic recording means and with each one disposed substantially orthogonally to said plated wire to locally saturate a definitive portion of said thin layer of magnetizable material so as to block the passage of information to be recorded on and/or information to be read from said magnetic recording means for definite periods of time dependent upon the length of time that current is selectively applied to said electrical conductors; and electrical current means connected to said channel selection means to selectively energize each of said electrical conductors excepting those associated with the channels which have information written onto and read from.

2. A magnetic read/write system according to claim 1 wherein there is further included electrical current conducting means connected to said plated wire to pass current therethrough in order to accomplish a writing operation.

3. A magnetic read/write system according to claim 1 wherein there is further included electrical current conducting means connected to said plated wire to conduct induced currents developed in said plated wire during a read operation and further including means to sense said induced current.

4. A magnetic read/write system according to claim 1 wherein said electrical conductors are flat, rectangularly shaped elements spaced in side by side relationship along the length of the said plated wire, each of said electrical conductors having a flat side parallel to the surface of the magnetic medium and centered opposite its respective recording channel.

References Cited

UNITED STATES PATENTS

| | | | |
|---|---|---|---|
| 2,901,549 | 8/1959 | Serrell | 340—174.1 |
| 3,152,225 | 10/1964 | Peters | 179—100.2 |
| 3,188,399 | 6/1965 | Eldridge | 179—100.2 |
| 3,311,901 | 3/1967 | Fedde et al. | 340—174 |

FOREIGN PATENTS

| | | |
|---|---|---|
| 846,009 | 8/1960 | Great Britain. |

BERNARD KONICK, Primary Examiner

W. F. WHITE, Assistant Examiner

U.S. Cl. X.R.

179—100.2; 346—74